US007234346B2

(12) United States Patent
Nelson (10) Patent No.: US 7,234,346 B2
(45) Date of Patent: Jun. 26, 2007

(54) SYSTEM AND METHOD FOR DETECTING AND DISPLAYING AN AMOUNT OF CHEMICAL IN A CYLINDER OR VESSEL

(75) Inventor: Mark B. Nelson, Orinda, CA (US)

(73) Assignee: Force Flow, Concord, CA (US)

( * ) Notice: Subject to any disclaimer, the term of this patent is extended or adjusted under 35 U.S.C. 154(b) by 83 days.

(21) Appl. No.: 10/996,559

(22) Filed: Nov. 23, 2004

(65) Prior Publication Data

US 2005/0126277 A1    Jun. 16, 2005

Related U.S. Application Data

(60) Provisional application No. 60/529,699, filed on Dec. 16, 2003.

(51) Int. Cl.
*G01F 17/00* (2006.01)
(52) U.S. Cl. ........................................ 73/149; 73/290 R
(58) Field of Classification Search ............... 73/149, 73/290 R, 299
See application file for complete search history.

(56) References Cited

U.S. PATENT DOCUMENTS 3,411,349 A * 11/1968 Smith et al. ........... 73/862.582
3,666,032 A * 5/1972 Maffia et al. ............... 177/256
3,831,687 A * 8/1974 Maffia et al. ............ 177/210 R
4,002,215 A * 1/1977 Harvill ........................ 177/146
4,056,156 A * 11/1977 Dayton ........................ 177/209
4,219,090 A * 8/1980 Dayton ........................ 177/208
4,427,133 A * 1/1984 Kierbow et al. .............. 222/77
4,836,308 A * 6/1989 Davis et al. .............. 177/25.14
5,117,373 A * 5/1992 Huff ............................ 702/173
5,606,516 A * 2/1997 Douglas et al. ............. 702/104
6,627,825 B1* 9/2003 Creswick ..................... 177/141
6,835,900 B2* 12/2004 Jones ........................... 177/145

* cited by examiner

*Primary Examiner*—Hezron Williams
*Assistant Examiner*—Rodney Frank
(74) *Attorney, Agent, or Firm*—Buchanan Ingersoll & Rooney LLP (57) ABSTRACT

A system and method for detecting and displaying the amount of chemical in a vessel. The system includes a vessel with a variable quantity of gas supported upon a moveable platform. A hydraulic load cell is positioned under the platform, and generates a hydraulic pressure signal, which is a function of the variable quantity of gas in the vessel. An electrical signal transducer converts the pressure signal to an electrical signal which is transmitted to a battery powered microprocessor/display capable of converting the electrical signal into a displayable signal indicative of an amount of gas remaining in the vessel.

9 Claims, 5 Drawing Sheets

SYSTEM AND METHOD FOR DETECTING AND DISPLAYING AN AMOUNT OF CHEMICAL IN A CYLINDER OR VESSEL

RELATED APPLICATION

This application claims priority to U.S. Provisional Patent Application No. 60/529,699, filed on Dec. 16, 2003, which is incorporated herein in its entirety.

FIELD OF THE INVENTION

This invention relates to a system and method for detecting and displaying an amount of chemical in a cylinder or vessel, and more particularly a system and method for detecting and displaying an amount of chlorine in a chlorine cylinder for water and wastewater treatment plants.

BACKGROUND OF THE INVENTION

The treatment of water and wastewater traditionally includes treatment with various chemicals such as chlorine and sodium hypochlorite for disinfection, sulfur dioxide and sodium bisulphate for dechlorination, hydrofluosilicic acid for fluoridation and many others for coagulation, ph control etc. Many state regulations require that municipal water agencies document their chemical usage in order verify proper dosages. A common way of tracking chemical usages is to simply place a chemical cylinder or drum on a weighing scale and track the weight loss on a daily basis.

However, the use of a typical weight scale for weighing cylinders or vessels of chlorine, fluoride and other chemicals can present several complications. Disinfection and fluoridation commonly occurs at remote locations such as well sites that often are not easily accessible, do not have electrical power on site, or simply have dirty power that is damaging to many electronic/digital type instruments. Accordingly, what is needed is a battery powered digital weight scale, which has a remotely located pressure to electrical signal transducer, which is capable of producing an electrical signal related to the pressure signal, which is then converted into a displayable signal indicative of the amount of gas or chemical remaining in the vessel.

BRIEF DESCRIPTION OF THE INVENTION

The present invention relates to a system and method for detecting and displaying an amount of gas or chemical in a vessel, and more particularly a system and method for detecting and displaying an amount of chlorine or sulfur dioxide in a vessel for water treatment plants.

Thus, in accordance with one aspect of the invention, a system for detecting and displaying the amount of chemical in a vessel, includes a vessel with a variable quantity of chemical; a moveable platform upon which the vessel is supported; a hydraulic load cell under the platform, positioned to generate a hydraulic pressure signal which is a function of the variable quantity of chemical in the vessel; a remotely mounted pressure to electrical signal transducer capable of providing an electrical signal related to the pressure signal; and a battery powered microprocessor capable of converting the electrical signal into a displayable signal indicative of an amount of chemical remaining in the vessel.

In accordance with another aspect of the invention, a method for detecting and displaying the amount of chemical in a vessel includes the steps of: (a) obtaining a system comprising: a vessel with a variable quantity of chemical; a moveable platform upon which the vessel is supported; a hydraulic load cell under the platform, positioned to generate a hydraulic pressure signal, which is a function of the variable quantity of chemical in the vessel; a remotely mounted pressure to electrical signal transducer capable of providing an electrical signal related to the pressure signal; and a battery powered microprocessor; and (b) converting the electrical signal into a displayable signal indicative of an amount of gas/chemical remaining.

In accordance with a further aspect of this invention, a system for detecting and displaying the amount of chemical in a vessel comprises a moveable platform upon which a vessel is supported, wherein the platform comprises: a drain ring configured to receive condensation from the vessel during a release of a compress gas from the vessel; a drain hole positioned within the drain ring; and a hose configured to remove the condensation from the drain ring; a hydraulic load cell under the platform, positioned to generate a hydraulic pressure signal, which is a function of a variable quantity of compressed gas in the vessel; and a remotely mounted pressure to electrical signal transducer capable of providing an electrical signal related to the pressure signal.

In accordance with another aspect of this invention, a system for detecting and displaying the amount of chemical in a vessel comprises: a moveable platform upon which a horizontal container is supported; a hydraulic load cell under the platform, positioned to generate a hydraulic pressure signal, which is a function of the variable quantity of chemical in the horizontal container; a remotely mounted pressure to electrical signal transducer capable of providing an electrical signal related to the pressure signal; and a moisture removal system comprising: a drip pan; at least one hole in the drip pan; and a hose connected to each of the at least one holes.

In another aspect, this invention includes a pressure conductor capable of transmitting the hydraulic pressure signal.

In a further aspect, this invention includes a display for displaying the amount of chemical remaining in the vessel.

In another aspect, this invention further includes an integrated time clock that allows computation of "loss in weight" feed rates and daily chemical/gas usage data.

In a further aspect, this invention further includes a 4–20 mA output signal capable of remotely transmitting remaining chemical, chemical feed rates or daily usage data.

In another aspect, this invention further includes a hi/lo level dry relay contact for remotely alarming remaining chemical, chemical feed rate, chemical feed rates or daily usage rates.

In a further aspect, this invention includes a system for detecting and displaying the amount of chemical in a vessel comprising: a moveable platform upon which a vessel is supported, wherein the platform comprises: a drain ring configured to receive condensation from the vessel during a release of a compress gas from the vessel; a drain hole positioned within the drain ring; and a hose configured to remove the condensation from the drain ring; and a hydraulic load cell under the platform, positioned to generate a hydraulic pressure signal, which is a function of a variable quantity of compressed gas in the vessel.

In another aspect, this invention includes a system for detecting and displaying the amount of chemical in a vessel comprising: a moveable platform upon which a horizontal container is supported; a hydraulic load cell under the platform, positioned to generate a hydraulic pressure signal, which is a function of the variable quantity of chemical in the horizontal container; and a moisture removal system comprising: a drip pan; at least one hole in the drip pan; and a hose connected to each of the at least one holes.

BRIEF DESCRIPTION OF THE DRAWINGS

The invention will now be described in greater detail with reference to the preferred embodiments illustrated in the accompanying drawings, in which like elements bear like reference numerals, and wherein.

DESCRIPTION OF THE INVENTION

Figure 1:
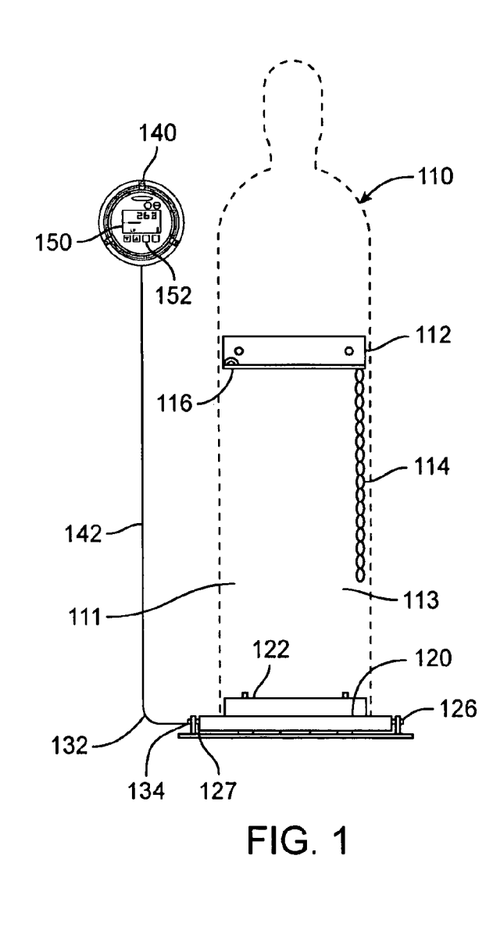
FIG. 1 shows an elevation view of a system for detecting and displaying an amount of gas or chemical in a vessel according to one embodiment of the invention.

Turning to the drawings, a system 100 for detecting and displaying an amount of gas and/or chemical in a vessel in accord with this invention is shown in FIG. 1. This system and the method of its use will be described in the context of chlorine or sulfur dioxide as the gas or chemical. It will be appreciated that these materials are not limiting and that this system and its use could work with a wide variety of gas and chemicals.

System 100 includes a vessel 110 having a variable quantity 113 of gas or chemical 111, which is supported on a moveable platform 120. The vessel 110 is preferably a cylinder like structure designed to hold a gas or a chemical 111 used in the treatment of water or wastewater. It can be appreciated that the vessel is preferably a gas cylinder as used in the water or wastewater industry. However, the type of vessel is not limiting and the system and methods according to this invention can be used with a variety of vessels. In addition, as indicated above, the system 100 is not limited to the treatment of water or wastewater and the system and its use can work with a wide variety of applications wherein gas or chemical detection and display of the amount of gas or chemical remaining in the vessel is needed.

In one embodiment, the vessel 110 is restrained to a wall by a wall mounted safety system. The wall mounted safety system includes a wall mounted chaining bracket 112, a safety chain 114, and a spring loaded snap hook 116. The wall mounted chaining bracket 112, the safety chain 114 and the spring loaded snap hook 116 insure that the vessel 110 is safety secured.

The moveable platform 120 includes a platform member 121. The platform member 121 preferably has a substantially rectangular shape. However, other shapes and configurations of the platform member 121 can be used without departing from the present invention. In one embodiment, the platform member 121 is connected at a first end to a pivot system 126. The pivot system 126 includes a pivot rod 127 and a pair of pivot points 128. A second end of the platform member 121 is positioned on a hydraulic load cell 130. The system and the method of use will be described in the context of a hydraulic load cell 130. However, it will be appreciated that in an alternative embodiment, a pneumatic load cell can be used.

Figure 4:
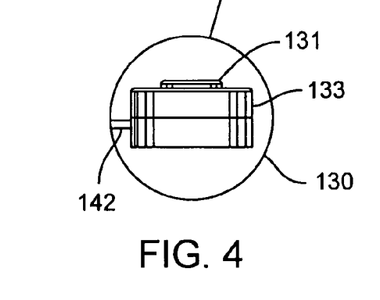
FIG. 4 shows an exploded view of the hydraulic load cell of FIG. 3.

The hydraulic load cell 130 is located under the platform member 121. As shown in FIG. 4, the typical hydraulic load cell 130 consists of a piston 131 adapted to move downwardly in response to a loading force into the interior of a closed cylinder 133. The downward movement acts upon fluid contained within a pressure chamber sealed by a diaphragm. The chamber communicates with a suitable pressure sensitive indicating device, such as a pressure transducer or a Bourdon tube mechanism, through a pressure-transmitting passageway and indicator conduit. The indicating device may be calibrated to read directly in terms of pounds or grams of force or in any other desired unit.

In the present application, the load cell 130 is preferably a hydraulic load cell; however, any conventional hydraulic or pneumatic load cell with a suitable weight capacity may be used as long as the load cell does not produce an electrical signal.

Figure 2:
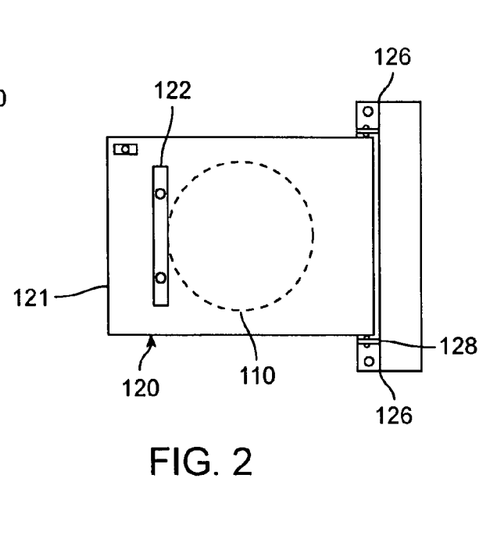
FIG. 2 shows a top view the system for detecting and displaying an amount of gas or chemical in the vessel of FIG. 1.
Figure 3:
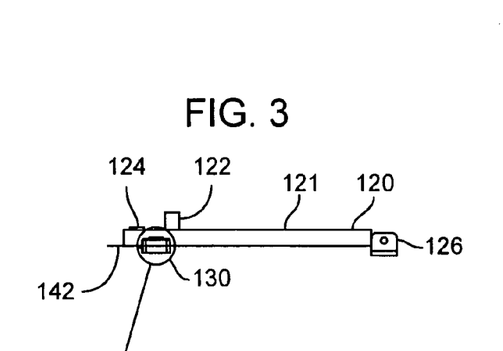
FIG. 3 shows an elevation view of a portion of the system of FIG. 1, including a moveable platform and a hydraulic load cell.

As shown in FIGS. 1–3, the platform 120 can also include an adjustable backstop 122. The backstop provides a means for preventing the vessel 110 from sliding off of the platform 122 and controls the location of the vessel 110 as the vessel is positioned properly on the platform 122 for an accurate reading. The platform 120 includes a platform mounted level 124 and a pivot member 126. The platform-mounted level 124 is position on an upper surface 121 of the platform 120. The platform-mounted level 124 insures that the platform 120 is level for an accurate reading of the amount of chemical 111 in the vessel 110.

In operation, a user places the vessel 110 containing a quantity of gas or chemical on the platform 120. The load cell 130 generates a hydraulic pressure signal 132, which is a function of the variable quantity of gas or chemical in the vessel 110. The hydraulic pressure signal is transmitted through line 142 to a remotely mounted pressure to electrical signal transducer 138. The remotely mounted pressure to electrical signal transducer 138 produces an electrical signal corresponding to the hydraulic pressure signal 132. If desirable, a pressure conductor 134 can be used to transmit the hydraulic pressure signal 132 through line 142 to the remotely mounted pressure to electrical signal transducer 138. Line 142 is preferably PVC coated copper tubing. However, other materials can be used for line 142 without departing from the present invention.

Figure 5:
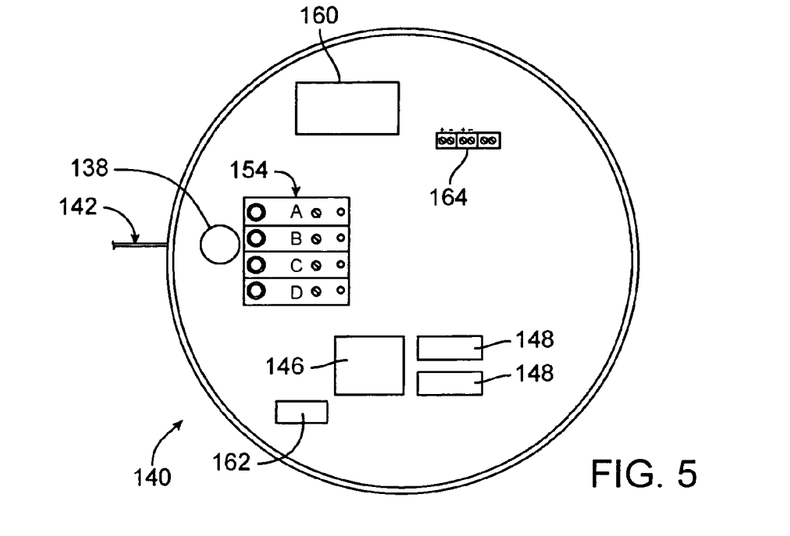
FIG. 5 shows a schematic view of the component layout of a controller used in the system and method of the present invention.
Figure 6:
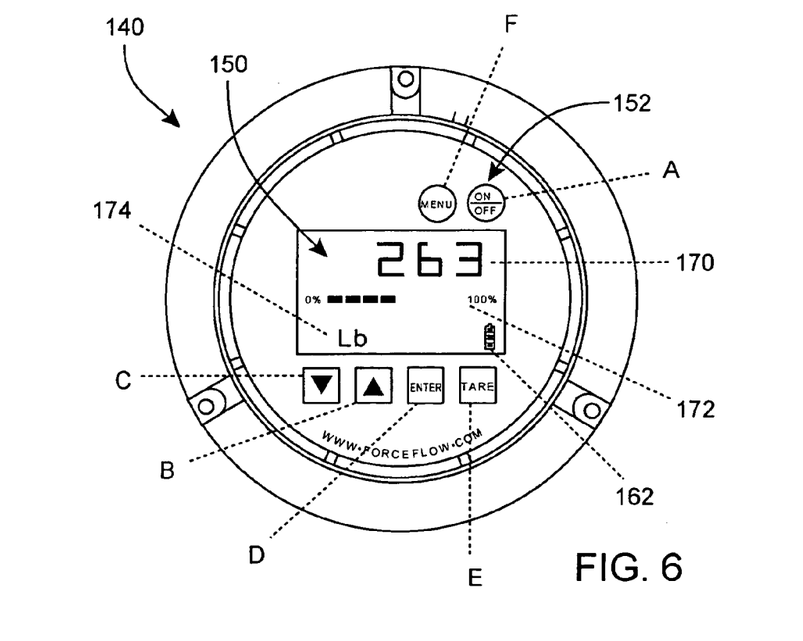
FIG. 6 shows a schematic view of a controller face illustrating the keypad functions and display of the controller used in the system and method of this invention.

A system controller 140 receives the electrical signal and converts the electrical signal via a microprocessor CPU 146 to a displayable signal indicative of the amount of chemical 111 remaining in the vessel 110. As shown in FIGS. 5 and 6, the system controller 140 includes a microprocessor CPU 146, memories 148, a display 150, an input keyboard 152 and relays 154. The microprocessor 146 (CPU) converts the electrical signal into a displayable signal indicative of an amount of gas or chemical remaining in the vessel 110. The controller 140 is powered by a power source 160. The power source 160 is battery operated; however units equipped with a 4–20 mA output use the DC loop power required for the output signal as the primary power, and the battery power as secondary power in the event that the 4–20 loop power fails.

An integrated time clock 162 within the controller 140 allows computation of "loss in weight" feed rates and daily chemicaugas usage data. In one embodiment, the controller 140 includes a 4–20 mA output signal 164 capable of remotely transmitting remaining chemical; chemical feed rates or daily usage data. In addition, the controller 140 can also include a hi/lo level dry relay 154 for remotely alarming remaining chemical, chemical feed rate, chemical feed rates or daily usage.

The controller 140 is preferably a hermetically sealed polypropylene case with front cam lock bezel. The controller 140 includes a standard case connection for flying leads will be a standard plastic, and a compression fitting. The fitting will preferably accommodate a 2-wire jacket (4/20 mA) or a 7-wire jacket (4/20 mA and 1 SPDT switch element). The connections for both the switch and 4/20 mA output will preferably be 24" flying leads. However, it can be appreciated that other connections can be used as known to one skilled in the art.

The controller 140 can also include a stainless steel sensor having a range of about 0/500 psi with a minimum of 9 menu selectable variations. The controller 140 will preferably have an accuracy of about 0.1% to about 0.25%, and more typically about 0.25% to about 0.50%. The temperature coefficient is 0.04% per deg F Max from ambient. In one embodiment, the temperature coefficient is preferably greater than about 0.02%. The controller 150 will also preferably have a non-volatile memory. Accordingly, if the controller is turned off or power is disconnected for any reason, stored parameters will be saved in memory.

The display 150 preferably has a minimum three-line display, 170, 172, and 174. For example, a three-line display can include:

Top Line 170: a 5-digit display (5 digits with a minus sign)

Middle line 172: a 0% to 100% bar graph where the 100% can be programmed.

When the gauge is at 100%, the 4/20 mA output will be 20 mA.

Lower Line 174: 5 alphanumeric characters

The input keyboard 152 has at least 6 functional buttons on the keypad including the following:

A. "ON/OFF" button: turns the controller 140/display 150 on when depressed and, when on, will turn the controller 140/display 150 off when depressed.

B. "UP" button: allows for scrolling "up":

C. "DOWN" button: allows for scrolling "down":

D. "ENTER" button: allows for saving a selected item to memory

E. "TARE" button: this button allows for changing the tare weight.

F. "MENU" button: the MENU button preferably has 8 scrollable (through the use of up and down buttons) menu options. These items wrap when scrolling in either direction "ZERO": will allow zeroing of the display (on start up and when the tare weight is zero). This function allows for compensation for a sensor's zero drift and elimination of "tongue weight".

"BAR": allows setting of the Display value at which the bar graph will be 100% and the 4/20 mA output will be 20 mA.

"OFF": this auto-off function allows for automatically turning the unit off after a programmed amount of time.

"RELAY": allows setting of the relay set point and pressure direction (Increase or decrease)

"RANGE": allows selection of the unit's pressure range

"RES: allows selection of display "resolution"

"ELIM": allows elimination of menu options

"EXIT": allows exit from menu

In addition, the display 150 can include a low battery icon 162. The low battery icon 162 can display the battery level in 3 segments depending upon battery power levels:

No segments filled: less than 10% battery life remaining 1 segment filled: 10% to 25% battery life remaining 2 segments filled: 25% to 50% battery life remaining 3 segments filled: 50% to 100% battery life remaining In a further embodiment, the display 150 can include an overpressure and an under pressure indication controls. For example, if the controller 140 exceeds the maximum pressure of the gauge, the display 150 can read:

Top line 170: actual pressure to 105% (blinking) a series of dashes over 105%

Middle line 172: full bar graph and 100% (all blinking)

Lower line 174: OVER (blinking)

The power source 160 is preferably a battery-powered source. However, a number of different battery or power sources can be used. For example, in one embodiment, the controller 140 is a battery-powered controller 140 (2 C size batteries) with a 2-minute auto time out (auto off) function. Batteries can be replaced through the front of the case. In another embodiment, the controller 140 includes a 4/20 mA output loop powered unit (with battery backup: 2 C size batteries). The 4/20 mA unit will have 2, 24 inch flying leads. On this controller 140 the "on/off" button will turn off the display but not affect the 4/20 mA signal. In another embodiment, the power source is a 4/20 mA (with battery backup: 2 C size batteries). This controller 140 will have 7, 24" flying leads (2 for 4–20 mA, 2 for 24V power supply, 3 for relay switch). The controller 140 can be also powered by a 24V supply, which is preferably for a switch operated power source. It will also have a 4–20 mA signal. If power is lost on the 24V supply, the power to the 4–20 mA will take over, but the switch will no longer function. If the 24V and the 4–20 loop are lost, the battery backup will take over, however the switch and the 4–20 mA signal will no longer function. On this controller 140 the "on/off" button will turn off the display but not affect the 4/20 mA signal, or switch functionality.

Figure 7:
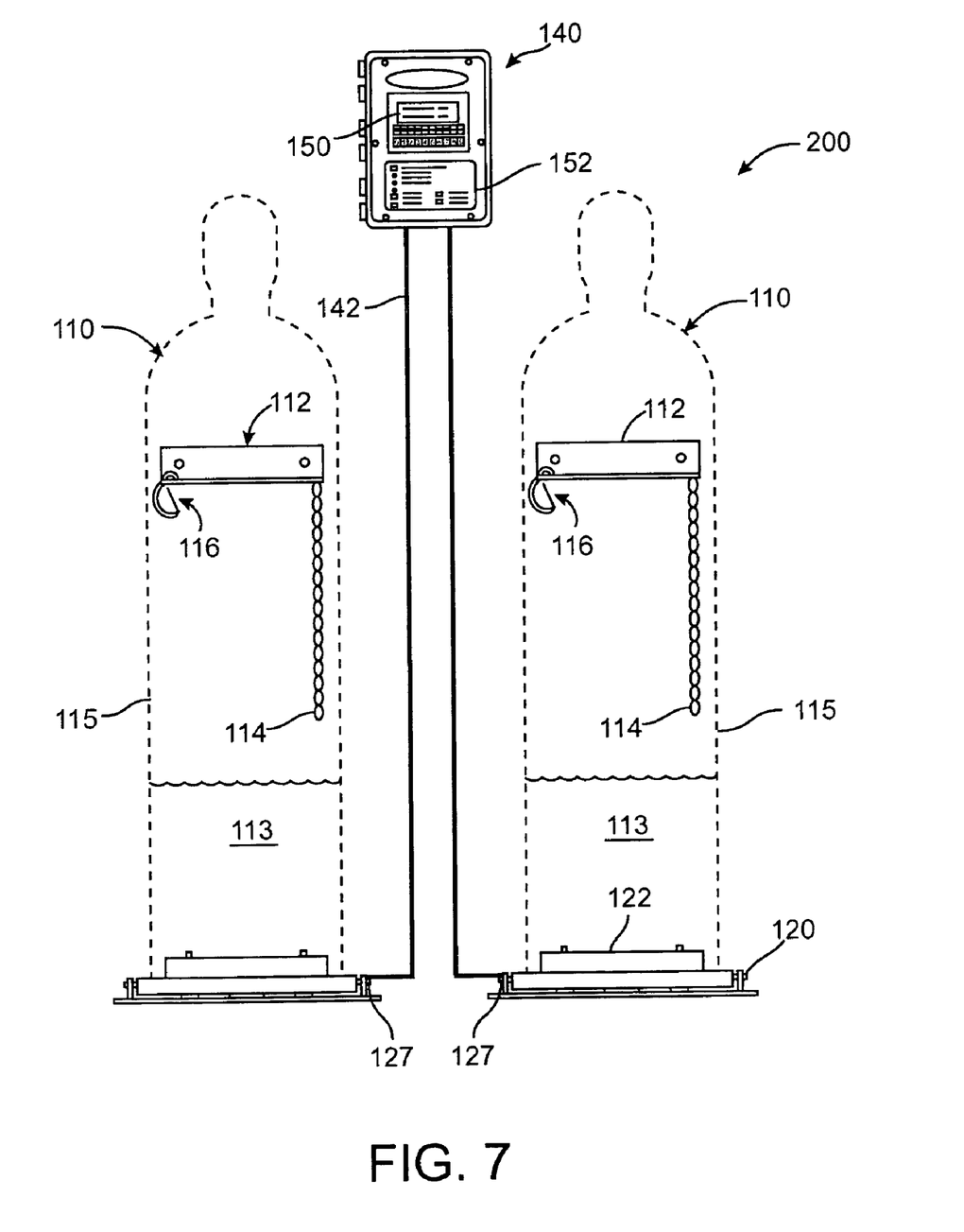
FIG. 7 shows an elevation view of a system for detecting and displaying an amount of gas or chemical in a vessel including a moisture removal system according to another embodiment of the invention.
Figure 8:
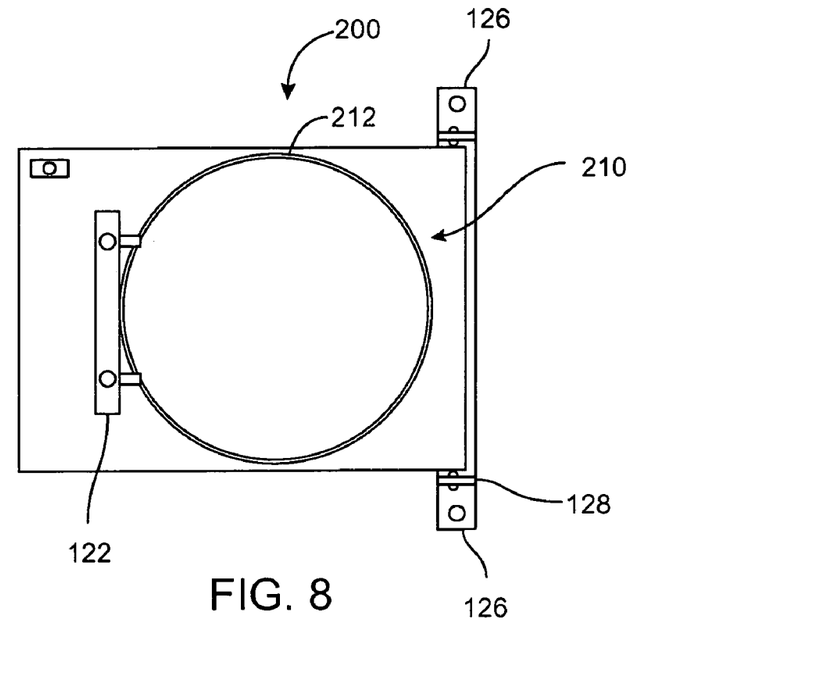
FIG. 8 shows a top view the system for detecting and displaying an amount of gas or chemical in the vessel of FIG. 7.
Figure 9:
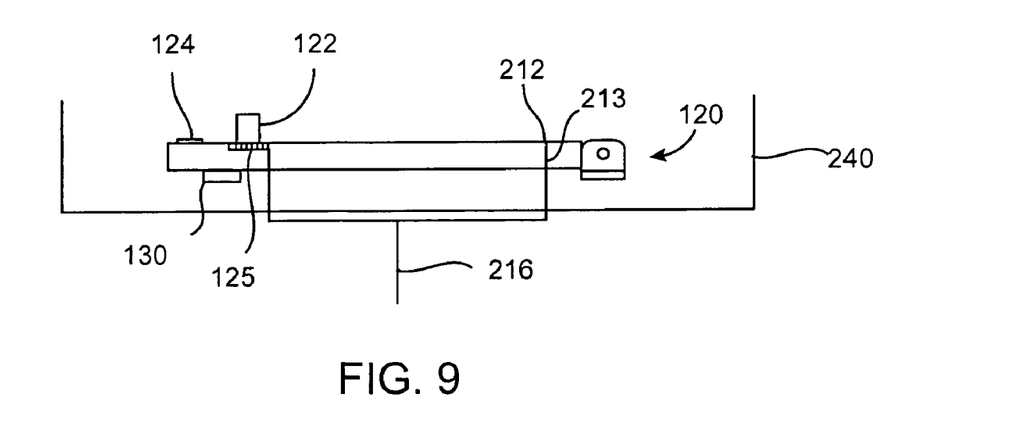
FIG. 9 shows an elevation view of a portion of the system of FIG. 7, including a moveable platform, a hydraulic load cell, and a calibration grid.

FIG. 7 shows a dual cylinder system 200 for detecting and displaying an amount of gas and/or chemical in a vessel 110. The system 200 also includes a moisture removal system 210, which can be used with the single cylinder system as shown in FIGS. 1–3, or the dual cylinder system 200 as shown in FIGS. 7–9. It can be appreciated that the moisture removal system 210 can be used with any number of cylinders and is designed to be incorporated with each platform 120 within the system 100, 200. This system 200 and the method of its use will be described in the context of chlorine, sulfur dioxide or ammonia as the gas or chemical, with ammonia being a preferred gas or chemical. However, it will be appreciated that these materials are not limiting and that this system and its use could work with a wide variety of gas and chemicals.

As shown in FIG. 7, the system 200 preferably comprises at least one vessel 110 having a variable quantity 113 of gas or chemical 111, which is supported on a moveable platform 120. The dual cylinder system comprises a pair of vessels 110 on a pair of movable platforms 120. The vessels 110 are preferably a cylinder like structure designed to hold a gas or a chemical 111 used in the treatment of water or wastewater. It can be appreciated that the vessels 110 are preferably a gas cylinder as used in the water or wastewater industry. However, the type of vessel is not limiting and the system and methods according to this invention can be used with a variety of vessels. In addition, as indicated above, the system 200 is not limited to the treatment of water or wastewater and the system and its use can work with a wide variety of applications wherein gas or chemical detection and display of the amount of gas or chemical remaining in the vessel is needed.

The vessels 110 are preferably restrained to a wall by a wall mounted safety system. The wall mounted safety system includes a wall mounted chaining bracket 112, a safety chain 114, and a spring loaded snap hook 116. The wall mounted chaining bracket 112, the safety chain 114 and the spring loaded snap hook 116 insure that the vessel 110 is safety secured.

As shown in FIG. 7, the system controller 140 receives the electrical signal and converts the electrical signal via a microprocessor CPU to a displayable signal indicative of the amount of chemical remaining in the vessel 110. The microprocessor (CPU) converts the electrical signal into a displayable signal indicative of an amount of gas or chemical remaining in the vessel 110. The controller 140 is powered by a power source. The power source is battery operated; however units equipped with a 4–20 mA output use the DC loop power required for the output signal as the primary power, and the battery power as secondary power in the event that the 4–20 loop power fails. It can be appreciated that the system controller 140 can be replaced any suitable display device that converts the pressure signal (hydraulic or electrical for an electronic load cell) into a displayable reading, including but not limited to a dial or digital display 150.

FIG. 8 shows a top view of the moveable platform 120 including the platform member 121. As shown in FIG. 8, the platform member 121 preferably has a substantially rectangular shape. However, other shapes and configurations of the platform member 121 can be used without departing from the present invention. In one embodiment, the platform member 121 is connected at a first end to a pivot system 126. The pivot system 126 includes a pivot rod 127 and a pair of pivot points 128. A second end of the platform member 121 is positioned on a hydraulic load cell 130. The system and the method of use will be described in the context of a hydraulic load cell 130. However, it will be appreciated that in an alternative embodiment, a pneumatic load cell can be used.

As shown in FIG. 9, the hydraulic load cell 130 is located under the platform member 121. The typical hydraulic load cell 130 consists of a piston 131 adapted to move downwardly in response to a loading force into the interior of a closed cylinder 133. The downward movement acts upon fluid contained within a pressure chamber sealed by a diaphragm. The chamber communicates with a suitable pressure sensitive indicating device, such as a pressure transducer or a Bourdon tube mechanism, through a pressure-transmitting passageway and indicator conduit. The indicating device may be calibrated to read directly in terms of pounds or grams of force or in any other desired unit.

The platform 120 can also include an adjustable backstop 122. The backstop provides a means for preventing the vessel 110 from sliding off of the platform member 121 and controls the location of the vessel 110 as the vessel is positioned properly on the platform member 121 for an accurate reading. The platform 120 includes a platform mounted level 124 and a pivot member 126. The platform-mounted level 124 is preferably attached to an upper surface 129 of the platform member 121. The platform-mounted level 124 insures that the platform 120 is level for an accurate reading of the amount of chemical 111 in the vessel 110.

The system 200 also includes the moisture removal system 210. The moisture removal system 210 provides increased reliability and lifespan to the system 200. In operation, when compressed gases, such as chlorine or ammonia gas, are removed from their respective vessels 110 at a rate that exceeds the latent heat of vaporization, the vessels begin to cool. If there is moisture present in the air, condensation begins to form on the outside of the vessel 110, which runs down the side of the vessel walls 115 to the platform 120. This excess moisture can cause not only inaccurate readings but also can cause complete scale failure.

As shown in FIG. 8, the upper surface of the platform 129 includes the moisture removal system 210. The moisture removal system comprises a drain ring 212 and a drain hole 214. For cylindrical vessels 110 having a circular base, the drain ring 212 is preferably a circular groove, which is machined into the upper surface 129 of the platform member 122. However, it can be appreciated that for vessels 110 having a non-circular shape, the drain ring 212 can have a configuration or shape similar to the base of the vessel 110. For example, for a vessel 110 having a rectangular or square base, the drain ring 212 will preferably have a rectangular or square shape. Accordingly, the shape of the drain ring 212 is not limited to a circular or ring configuration and other suitable configurations of the drain ring 212 are anticipated.

For a vertical 150 lbs cylinder as used in the waste water industry, the drain ring 212 preferably has a depth 213 of approximately ⅛ of an inch to approximately ½ of an inch and a width 215 of approximately ⅛ of an inch to approximately ⅝ of an inch. It can be appreciated that if larger or smaller vessels 110 are used, the depth and width of the drain ring 212 will vary accordingly.

In addition, the depth 213 of drain ring 212 preferably varies along the circumference of the drain ring 212 such that the depth 213 of the drain ring 212 is greater at certain points creating at least one low point 217 along the circumference of the drain ring 212. The low point 217 assists with the drainage of excess water and moisture from the vessel 110 and the moveable platform 120. The depth 213 of the drain ring 212 preferably varies to the low point 217 and has a gradient or change of depth of between about 0.01% to about 1.0%.

The drain ring 212 can be manufactured as part of the moveable platform 120 or alternatively the drain ring 212 can be machined into the top surface of the platform member 122.

The drain ring 212 also preferably comprises at least one drain hole 214 configured to remove or drain the moisture from the drain ring 212. If the drain ring 212 has a low point 217, the at least one drain hole 214 is positioned at the low point 217 of the drain ring 212. Alternatively a plurality of drain holes 214 can be positioned at equal distances from one another.

The drain hole 214 is preferably connected to a hose 216. It can be appreciated that if a plurality of drain holes 214 are used, the moisture removal system 210 preferably comprises an equal number of drain hoses 216. The plurality of drain hoses 216 can be interconnected to a single drain hose or each of the individual drain hoses 216 can have their own end point. The hose 216 is configured to direct moisture away from the platform 122 and load cells 130. The hose 216 is preferably comprised of a flexible material, such that the end of the hose 216 can be positioned at any desirable location and directs moisture or water away from the hydraulic load cells 130 and platform 122.

In operation, the vessel 110 is positioned within the drain ring 212. Preferably, the outer diameter of the vessel 110 is approximately equal to the inside diameter of the drain ring 212. It can be appreciated that the inside diameter of the drain ring 212 can be slightly larger or slightly smaller than the outside diameter of the vessel 110 without departing from the present invention.

Since many states require secondary containment for chemical tanks and drums that are used at water and wastewater treatment plants, platform scales are often placed on top of a containment pallet or inside the containment area. In the latter case, the traps of chemical spills and moisture around the scale can accelerate corrosion and shortening of the life span of the scale and load cells. However, by integrating into the removable platform 120 with a secondary containment device 240 as shown in FIG. 9, the customer no longer has additional cost for separate contaminants. In addition, the secondary containment device 240 can decrease corrosion associated with mounting the system 100 including the moveable platform 120 inside the contaminant area.

Figure 10:
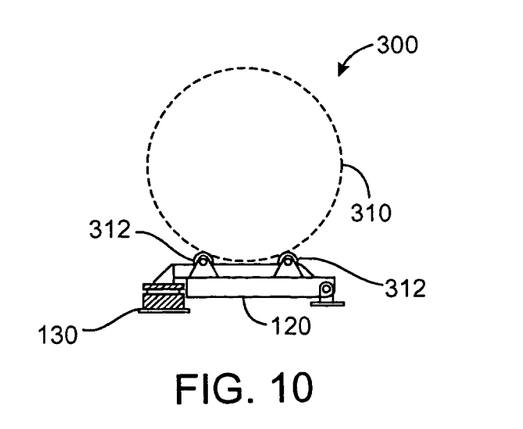
FIG. 10 shows an end view of a system for detecting and displaying for a one ton horizontal container including a moisture removal system according to another embodiment of the invention.
Figure 11:
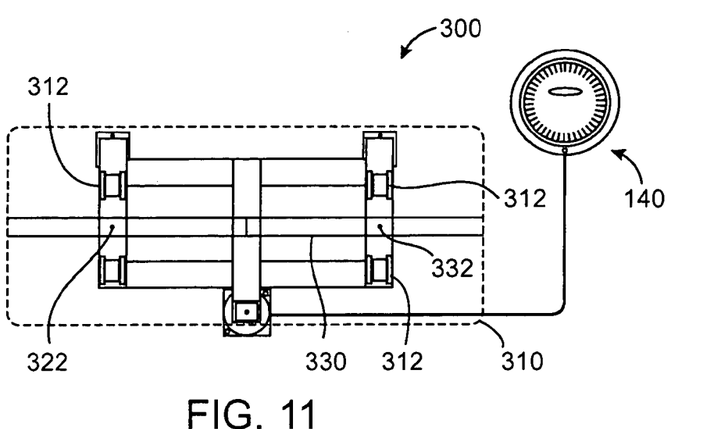
FIG. 11 shows a top view of the system for detecting and displaying an amount of gas or chemical of FIG. 10.
Figure 12:
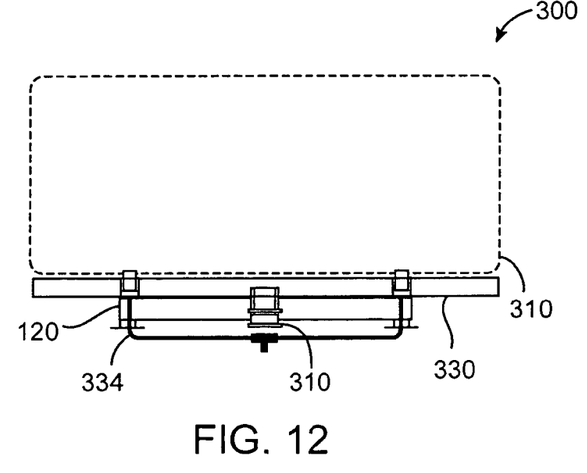
FIG. 12 shows an elevation view of the system for detecting and displaying an amount of gas or chemical of FIG. 10.

FIGS. 10–12 show an alternative embodiment of a moisture removal system 300 for a horizontal one-ton container 310. As shown in FIGS. 10–12, the one-ton container 310 is positioned on a platform 120 on plurality of cylindrical supports 312. The cylindrical supports 312 prevent the container 310 from rolling or being dislodged from the platform 120. The moisture removal system 200 comprises a drip pan 330 having at least one drain hole 332 connected a hose 334 to direct the water and moisture away from the platform 120.

The drip pan 330 is preferably constructed of a plastic material or steel type material and is positioned underneath the one ton container 310. However, it can be appreciated that the drip pan 330 can be constructed of any suitable material, including but not limited to polymeric or synthetic materials.

The drip pan 330 preferably runs the entire length of the container 310, with the width of the drip pan 330 varying based on the cylindrical shape of the container 310. For example, the width of the drip pan can vary between about 5% to about 100% of the width of the container 310 and is preferably about 10% to about 25% of the width of the container 310.

The drip pan 330 will also include at least one drain hole 332 preferably positioned at a low point 336 of the drip pan 330. The low point 336 can be obtained by designing the drip pan 330 to have a slight gradient or gradual slope towards the at least one drain hole 332. The drain holes 332 are connected to a hose 334 or pipe to direct moisture and water away from the container 310.

While this invention has been described with reference to the preferred embodiment described above, it will be appreciated that the configuration of this invention can be varied and that the scope of this invention is defined by the following claims.

What is claimed is:

1. A system for detecting and displaying the amount of chemical in a vessel comprising:
   a moveable platform upon which a vessel is supported, wherein the platform comprises:
      a drain ring configured to receive condensation from the vessel during a release of a compress gas from the vessel;
      a drain hole positioned within the drain ring; and
      a hose configured to remove the condensation from the drain ring; and
   a hydraulic load cell under the platform, positioned to generate a hydraulic pressure signal, which is a function of a variable quantity of compressed gas in the vessel.

2. The system of claim 1, further comprising a remotely mounted pressure to electrical signal transducer capable of providing an electrical signal related to the pressure signal.

3. The system of claim 2, further comprising a battery powered microprocessor capable of converting the electrical signal into a displayable signal indicative of an amount of chemical remaining in the vessel.

4. The system of claim 1, wherein the vessel is a vertical cylinder.

5. The system of claim 1, further comprising a secondary contaminant device, wherein the secondary contaminant device is integrated into the system.

6. A system for detecting and displaying the amount of chemical in a vessel comprising:
   a moveable platform upon which a horizontal container is supported;
   a hydraulic load cell under the platform, positioned to generate a hydraulic pressure signal, which is a function of the variable quantity of chemical in the horizontal container; and
   a moisture removal system comprising:
      a drip pan;
      at least one hole in the drip pan; and
      a hose connected to each of the at least one holes.

7. The system of claim 6, further comprising a remotely mounted pressure to electrical signal transducer capable of providing an electrical signal related to the pressure signal.

8. The system of claim 7, further comprising a battery powered microprocessor capable of converting the electrical signal into a displayable signal indicative of an amount of chemical remaining in the vessel.

9. The system of claim 6, further comprising a secondary contaminant device, wherein the secondary contaminant device is integrated into the system.

* * * * *